(12) United States Patent
Taniguchi

(10) Patent No.: US 7,164,856 B2
(45) Date of Patent: Jan. 16, 2007

(54) DISTANCE MEASUREMENT AND PHOTOMETRY SENSOR DEVICE

(75) Inventor: Hidenori Taniguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 10/762,633

(22) Filed: Jan. 22, 2004

(65) Prior Publication Data

US 2004/0189980 A1    Sep. 30, 2004

(30) Foreign Application Priority Data

Jan. 23, 2003   (JP)   ............... 2003-014266

(51) Int. Cl.
*G03B 7/99*    (2006.01)
*G01C 3/08*    (2006.01)

(52) U.S. Cl. .............. 396/114; 396/234; 356/3.14

(58) Field of Classification Search ........... 396/111, 396/114, 234, 268; 356/3.08, 3.14
See application file for complete search history.

(56) References Cited

U.S. PATENT DOCUMENTS 6,791,672 B1 *  9/2004  Ohkado ............... 356/3.13
6,973,265 B1 * 12/2005  Takahashi ........... 396/121

\* cited by examiner

*Primary Examiner*—W. B. Perkey
(74) *Attorney, Agent, or Firm*—Cowan, Liebowitz & Latman, P.C.

(57) ABSTRACT

In a distance measurement and photometry sensor device in which sensors are arranged on the same plane to be formed in the form of a semiconductor chip, a photometry sensor is arranged such that its sensor center is deviated by a predetermined distance in a direction perpendicular to a base length direction in which sensor centers of a pair of first and second line sensors are connected with each other.

9 Claims, 5 Drawing Sheets

DISTANCE MEASUREMENT AND PHOTOMETRY SENSOR DEVICE

BACKGROUND OF THE INVENTION

1. Field of the Invention

The present invention relates to an improvement in a distance measurement and photometry sensor device suitable for a lens shutter camera or the like.

2. Related Background Art

Heretofore, as for a device loaded with a photometry sensor and a distance measurement sensor for use in a lens shutter camera, there is a distance measurement and photometry sensor device disclosed in U.S. Pat. No. 5,302,997. A schematic planer layout of this distance measurement and photometry sensor device is shown in FIG. 7. Note that, the term distance measurement means to obtain distance information or defocus information, i.e., focal point adjustment information.

In the figure, a photometry sensor 30 includes a photometry center segment 32, photometry inner segments 34A to 34D, and photometry outer segments 36A to 36D. Line sensors 40 and 42 each includes a plurality of photodiodes (1 to n) constituting pixels. Distance measurement sensors are constituted by those line sensors 40 and 42, respectively. On a semiconductor substrate 50, the photometry sensor and a circuit portion for executing a signal processing for the photometry sensor, and the distance measurement sensors and circuit portions (each including amplifiers, noise removal circuits, maximum value detection circuits, signal output circuits, and registers) for executing a signal processing for the distance measurement sensors are mounted. Those constituent elements constitute the distance measurement and photometry sensor device. In addition, reference symbols H and W designate a height and a width of a photometry area, respectively, and reference symbol D designates a base length.

For the purpose of carrying out the distance measurement on the basis of the detection of a phase difference, two line sensors 40 and 42 are required for the above-mentioned distance measurement sensors. A certain distance, a so-called base length D of about several millimeters is required between the two line sensors 40 and 42. Thus, a space is present between the line sensors 40 and 42 in terms of layout. Consequently, the photometry sensor 30 is provided between the line sensors 40 and 42, whereby the two kinds of sensors are efficiently arranged on the semiconductor substrate 50.

In addition, there is proposed a sensor device in which imaging lenses for imaging a reflected light from a photographing screen on the distance measurement sensors (the line sensors 40 and 42), and the photometry sensor 30 are provided in correspondence to the distance measurement sensors, and the photometry sensor 30, respectively. Also, there is proposed a sensor device in which in order to make the projection positions on a subject coincide with each other, as shown in FIG. 7, centers of the distance measurement sensors and the photometry sensor are arranged so as to be coaxial (on a line designated with reference numeral 60) in a direction parallel with the base length direction.

However, in the above-mentioned prior art, the line sensors 40 and 42 as the constituent elements of the distance measurement sensors, and the photometry sensor 30 are arranged on the same plane as the semiconductor substrate 50, and the sensor centers of the line sensors 40 and 42, and the sensor center of the photometry sensor 30 are made to be coaxial in the direction parallel with the base length direction. As a result, the respective sizes of the semiconductor chip in the base length direction and in a direction perpendicular to the base length direction (in a vertical direction in FIG. 7) cannot be reduced so much.

More specifically, each of the line sensors is constituted by a plurality of photodiodes, and circuit portions (refer to FIG. 3 which will be described later) for executing a signal processing such as amplifiers, noise removal circuits, maximum value detection circuits, signal output circuits, and registers are required for the photodiodes. In FIG. 7, those circuit portions are arranged in a direction perpendicular to the base length direction of the line sensors (in order to efficiently utilize a space in the vertical direction). In addition, the sensor centers of the distance measurement line sensors, and the sensor center of the photometry sensor are made to be coaxial in the direction parallel with the base length direction. Thus, the circuit portions are arranged so as to form a line in the vertical direction with respect to the positions of the distance measurement line sensors and the photometry sensor. Consequently, there is encountered a problem that the respective sizes of the semiconductor chip, on which the distance measurement line sensors and the photometry sensor are formed, in the base length direction and in the vertical direction can not be reduced so much.

SUMMARY OF THE INVENTION

The present invention has been made in consideration of the above situation, and has as its object to realize a distance measurement and photometry sensor device in which a size of a semiconductor chip having the sensor device formed thereon can be reduced.

According to the present invention, the foregoing object is attained by providing a distance measurement and photometry sensor device, including:

first and second sensors arranged apart from each other in a first direction for receiving lights from the outside;

a photometry sensor arranged between the first and second sensors and adapted to receive the light from the outside; and a signal processing unit including circuit portions for processing signals from the first and second sensors, in which:

the first and second sensors, the photometry sensor, and the signal processing unit are formed in the form of the same semiconductor chip; and the photometry sensor is arranged so as to be deviated from each of the first and second sensors by a predetermined distance, and the circuit portions constituting the signal processing unit are arranged in a direction perpendicular to the first direction with respect to the first and second sensors.

According to the present invention, the foregoing object is also attained by providing a distance measurement and photometry sensor device, including:

first and second sensors arranged apart from each other in a first direction for receiving lights from the outside;

a signal processing unit including a photometry sensor arranged between the first and second sensors for receiving the light from the outside and circuit portions for processing signals from the first and second sensors;

first and second optical systems for guiding the lights from the outside to the first and second sensors, respectively; and a third optical system for guiding the light from the outside to the photometry sensor, in which:

the first and second sensors, the photometry sensor, and the signal processing unit are formed in the form of the same semiconductor chip; and the photometry sensor is arranged so as to be deviated from each of the first and second sensors by a predetermined distance, and the first and second optical systems and the third optical system are arranged so as to deviate optical axes of the first and second optical systems and an optical axis of the third optical system from each other in a direction perpendicular to the first direction by the predetermined distance.

According to the present invention, the foregoing object is also attained by providing a distance measurement and photometry sensor device, including:

first and second sensors arranged on the same semiconductor chip apart from each other by a predetermined base length for receiving lights from a subject;

a photometry sensor arranged between the first and second sensors on the semiconductor chip for receiving the light from the subject; and first, second and third optical units for focusing or condensing the lights from the subject on the first and second sensors and the photometry sensor, respectively, in which the pair of first and second sensors, and the photometry sensor are arranged so as to be offset in a direction perpendicular to a base length direction by a predetermined distance, and optical axes of the optical units correspond to the distance at which the first and second sensors, and the photometry sensor are offset.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

First Embodiment

Figure 1:
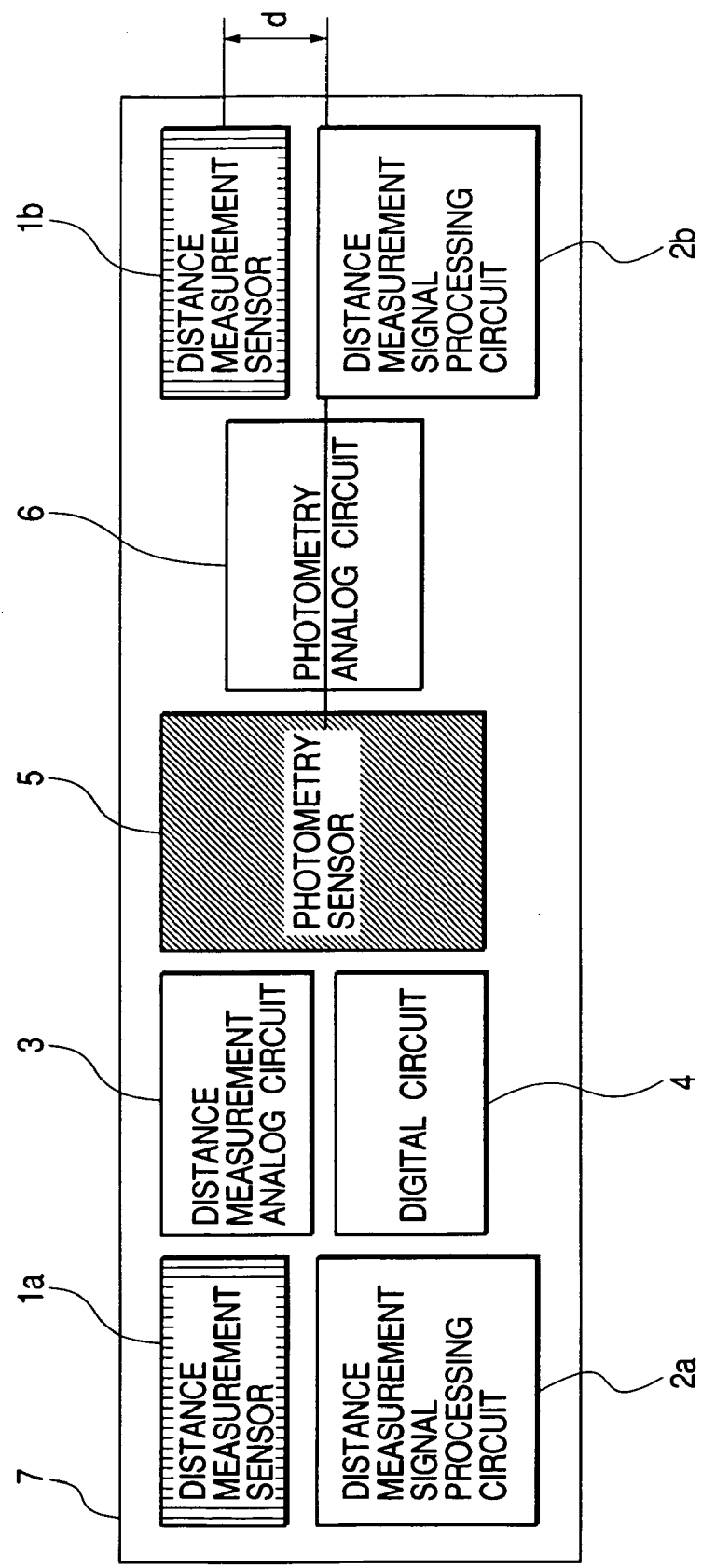
FIG. 1 is a structural diagram showing a schematic planer layout of a distance measurement and photometry sensor device according to an embodiment of the present invention.

FIG. 1 is a structural diagram showing a schematic planer layout of a distance measurement and photometry sensor device according to an embodiment of the present invention.

In FIG. 1, line sensors $1a$ and $1b$ are arranged apart from each other by a predetermined base length in order to obtain distance information or defocus information, i.e., focal point adjustment information. Each of the line sensors $1a$ and $1b$ is divided into pixels constituted by a plurality of photodiodes. Those line sensors $1a$ and $1b$ constitute distance measurement sensors. In addition, the line sensors $1a$ and $1b$ are arranged so as to be coaxial in a direction parallel with a base length direction (in a horizontal direction in FIG. 1). The distance and photometry device further includes distance measurement signal processing circuits $2a$ and $2b$, a distance measurement analog circuit 3 for amplifying pixel signals successively outputted from the distance measurement signal processing circuits $2a$ and $2b$ to output the amplified pixel signals, and a digital circuit 4. A photometry sensor 5 constituted by a plurality of photodiodes is arranged so as to be offset with respect to the distance measurement sensors $1a$ and $1b$ by a distance d as shown in FIG. 1, i.e., so as to be deviated in a direction perpendicular to the base length direction (in a downward direction in this example) by the distance d. Further, a distance measurement analog circuit 6 converts a current signal outputted from the photometry sensor 5 into a voltage signal to output the resultant voltage signal, and a semiconductor substrate 7 serves as a substrate of a semiconductor chip on which the distance measurement and photometry sensor device is formed.

Figure 2:
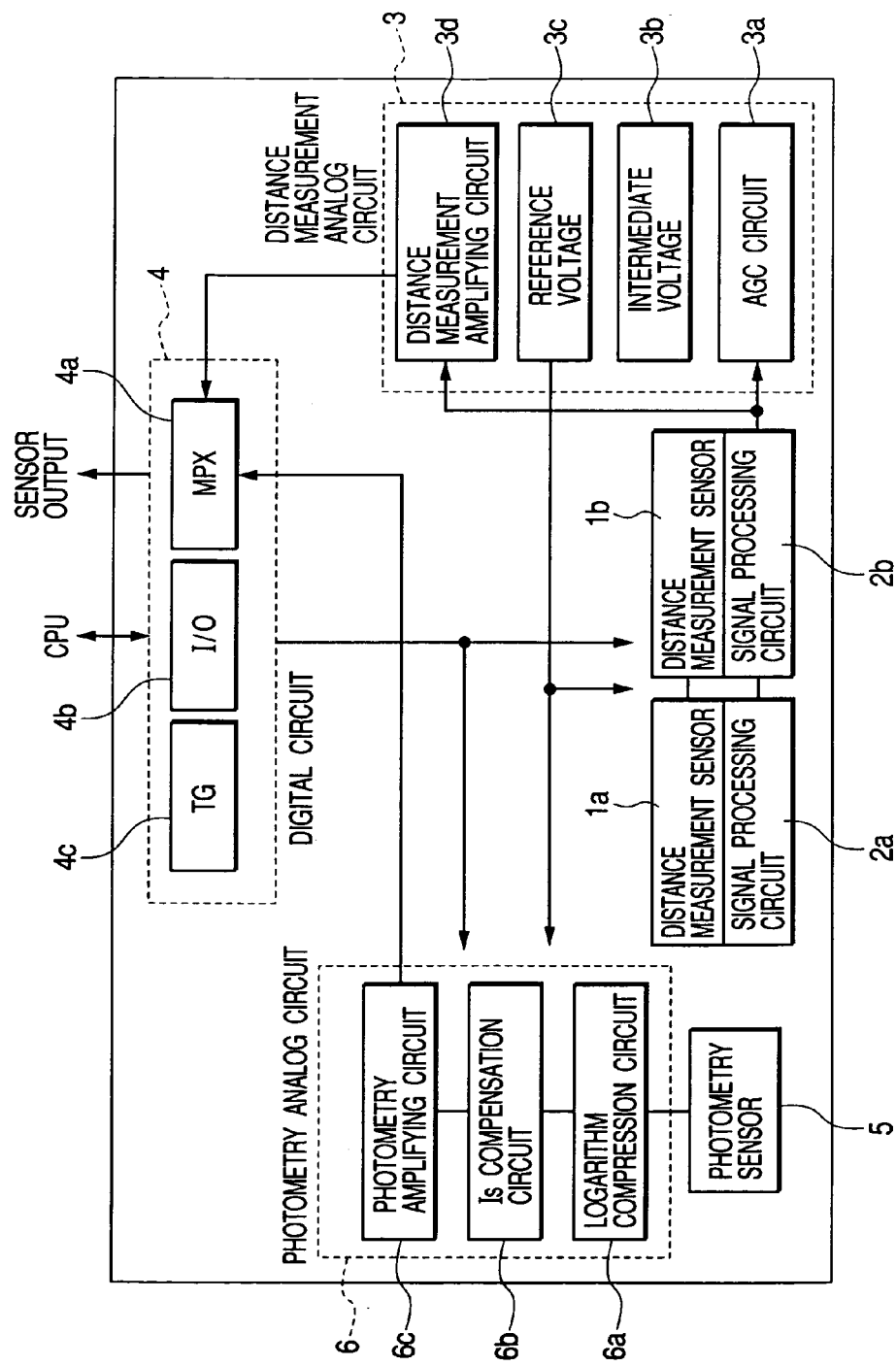
FIG. 2 is a block diagram showing a circuit configuration of the distance measurement and photometry sensor device shown in FIG. 1.

FIG. 2 is a block diagram showing a circuit configuration of the distance measurement and photometry sensor device shown in FIG. 1. In the figure, corresponding constituent elements are designated by the same reference numerals as those in shown in FIG. 1.

In FIG. 2, reference numerals $1a$ and $1b$ designate line sensors constituting distance measurement sensors, respectively, and reference numerals $2a$ and $2b$ designate distance measurement signal processing circuits, respectively. A distance measurement analog circuit 3 includes an AGC (Automatic Gain Control) circuit $3a$ for suitably controlling a quantity of electric charges accumulated in the line sensors $1a$ and $1b$; an intermediate voltage generation unit $3b$ for supplying a suitable bias voltage to each of portions of the line sensors; a reference voltage generation unit $3c$ for generating an intermediate voltage; and a distance measurement amplifying circuit $3d$ for amplifying output signals from the distance measurement signal processing circuits $2a$ and $2b$, respectively. A digital circuit 4 includes a multiplex circuit (MPX) $4a$ for selecting an output voltage signal between output voltage signals from the distance measurement amplifying circuit $3d$ and a distance measurement amplifying circuit which will be described later to output the selected output voltage signal from the distance measurement and photometry sensor device (semiconductor chip) to the outside; an I/O unit $4b$ for an interface between the distance measurement and photometry sensor device and a controlling microcomputer (CPU); and a timing generator (TG) $4c$ for generating a driving timing for the distance measurement and photometry sensor device. Reference numeral 5 designates a photometry sensor constituted by a photodiode. Further, a photometry analog circuit 6 includes a known logarithm compression circuit 6a for logarithmically compressing an output signal from the photometry sensor 5; a known Is compensation circuit 6b for canceling a reverse saturation current from the logarithm compression circuit 6a; and a photometry amplifying circuit 6c for amplifying an output voltage signal from the Is compensation circuit 6b to output the amplified output voltage signal.

Figure 3:
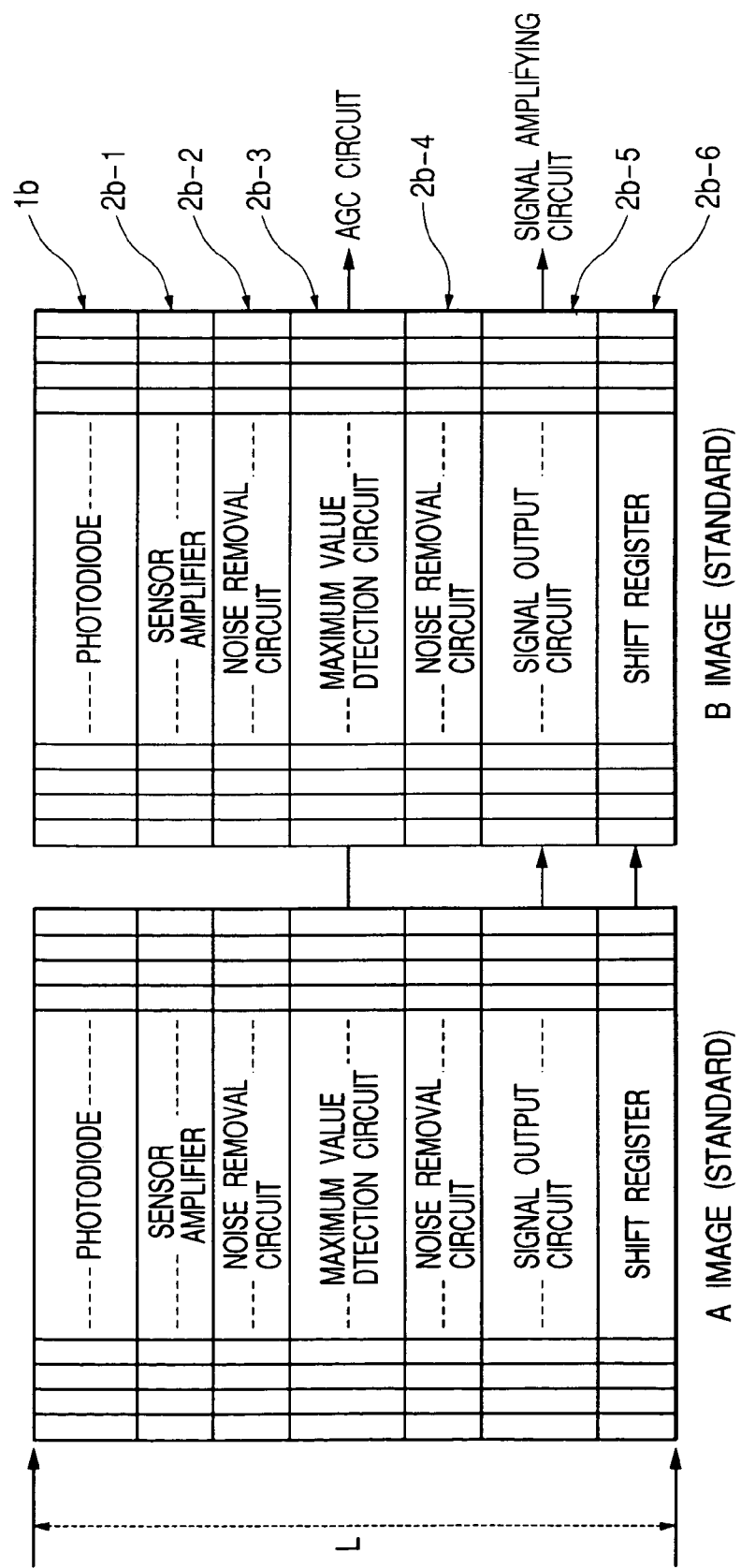
FIG. 3 is a diagram showing circuit configurations of signal processing circuits for distance measurement shown in FIGS. 1 and 2 and layout of the circuits on a semiconductor substrate shown in FIG. 1.

FIG. 3 is a diagram showing circuit configurations of the distance measurement signal processing circuits 2a and 2b shown in FIGS. 1 and 2, and layout of the circuits on the semiconductor substrate 7 shown in FIG. 1. Note that, while reference numerals on an A image side are not shown in the figure for the sake of simplicity of the description, the reference numerals are the same as those on a B image side and hence are omitted here.

Reference numeral 1b, as has already been described, designates a line sensor constituted by a plurality of photodiodes. A plurality of sensor amplifiers 2b-1 are provided in correspondence to the photodiodes, respectively, and serve to output the electric charges accumulated in the photodiodes in the form of voltages. While not illustrated in the figure, the sensor amplifiers have a reset unit for resetting the photodiodes to a predetermined voltage, and a memory unit for storing therein the electric charges accumulated in the photodiodes upon end of the accumulation. Further, there are provided: a plurality of noise removal circuits 2b-2 for holding the voltages of the photodiodes right after completion of the reset to remove a fixed pattern noise (FPN) in order to transmit output signals of the sensor amplifiers; a plurality of maximum value detection circuits 2b-3 for detecting an output signal having a maximum value among output signals from the above-mentioned plurality of noise removal circuits 2b-2 to execute a processing in the AGC circuit based on the output signal having the maximum value in order to control the charge accumulation; a plurality of noise removal circuits 2b-4 similar in configuration to the above-mentioned plurality of noise removal circuits 2b-2; a plurality of signal output circuits (buffer amplifiers) 2b-5 for outputting output signals from the above-mentioned plurality of noise removal circuits 2b-4; and a plurality of shift registers 2b-6 for successively outputting output signals from the signal output circuits 2b-5 to the distance measurement amplifying circuit 3d shown in FIG. 2 in accordance with a clock signal sent from the outside.

Note that, the above-mentioned circuits shown in FIG. 3 are the same as those proposed in Japanese Patent Application Laid-Open No. 2000-180706.

The distance measurement sensor device constituted by the line sensors 1a and 1b, and circuits for executing a signal processing for the line sensors 1a and 1b detects a phase difference on the basis of a pair of signals (an A image signal and a B image signal) of the line sensors 1a and 1b successively outputted from the above-mentioned plurality of shift registers to carry out a distance measurement (while a defocus signal is supposed in this example, a signal corresponding to a distance may also be adopted). In addition, sizes of the line sensors and the distance measurement signal processing circuit on the semiconductor substrate 7, with respect to the base length direction, are determined on the basis of a predetermined size of the base length, cell sizes of the photodiodes, and the number of cells of the photodiodes (i.e., the number of pixels). The sizes of the line sensors and the distance measurement signal processing circuit on the semiconductor substrate 7, with respect to the vertical direction, are determined on the basis of sizes of the photodiodes in a longitudinal direction(in a direction perpendicular to the base length direction), and layout (a space between the circuits arranged next to one another in the direction perpendicular to the base length direction) of the distance measurement signal processing circuits.

Figure 4:
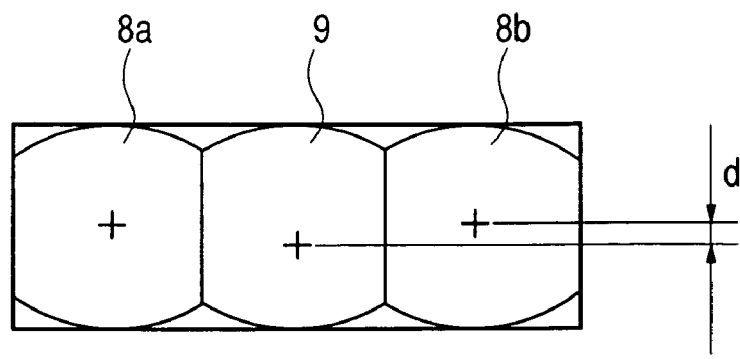
FIG. 4 is a front view showing optical systems provided in the distance measurement and photometry sensor device according to the embodiment of the present invention.

FIG. 4 is a front view showing optical systems provided in the distance measurement and photometry sensor device.

In FIG. 4, imaging lenses 8a and 8b are used to focus lights reflected from a subject onto the line sensors 1a and 1b, respectively. A condenser lens 9 condenses light reflected from a photographing screen. Note that, proper use of popular names of the above-mentioned imaging lenses and condenser lens will be described later. In addition, crosses shown in the imaging lenses 8a and 8b, and the condenser lens 9 indicate centers of optical axes of the respective lenses. The centers of the optical axes of the respective lenses, in correspondence to a deviation (offset) between the line sensors 1a and 1b, and the photometry sensor 5 in the direction perpendicular to the base length direction, are deviated (offset) so as to obtain the same relationship as that between the line sensors 1a and 1b, and the photometry sensor 5. That is to say, the imaging lenses 8a and 8b for distance measurement are arranged so as for the centers of the optical axes thereof to be deviated in the direction perpendicular to the base length direction (in the upward direction in this example) with respect to the center of the optical axis of the condenser lens 9 for photometry by a distance d.

Figure 5:
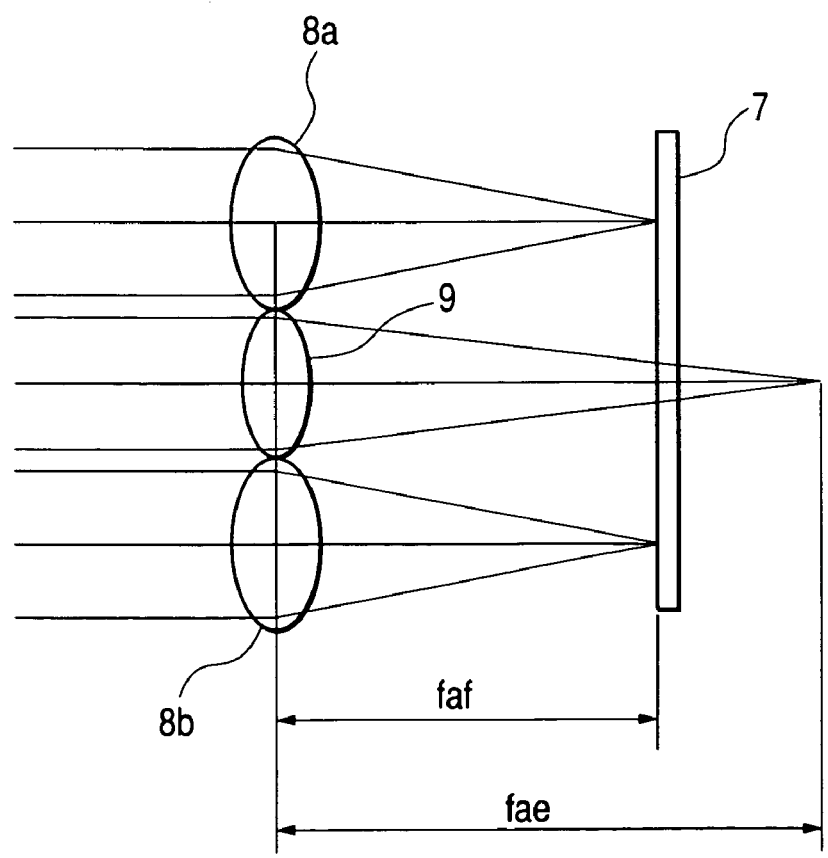
FIG. 5 is a view showing optical paths of the optical systems for distance measurement and photometry shown in FIG. 4.

FIG. 5 is a view showing optical paths of the optical systems for distance measurement and photometry shown in FIG. 4.

In FIG. 5, a focal length of each of the imaging lenses 8a and 8b as an optical system for the line sensors 1a and 1b is faf. In the figure, the imaging lenses 8a and 8b are located so as to focus the lights reflected from the subject on the surfaces of the line sensors 1a and 1b on the semiconductor substrate 7, respectively. In addition, a focal length of the condenser lens 9 as a photometry optical system is fae, and a focal position of the condenser lens 9, as apparent from the figure, is located backwardly with respect to the surface of the photometry sensor. Thus, though the photometry sensor condenses the light from the subject surface, the photometry sensor cannot image the light from the subject surface on a photographing surface on which the lights are imaged by the imaging lenses 8a and 8b, respectively. Consequently, as described above, the optical systems are distinctively called the imaging lenses and the condenser lens, respectively.

Figure 6:
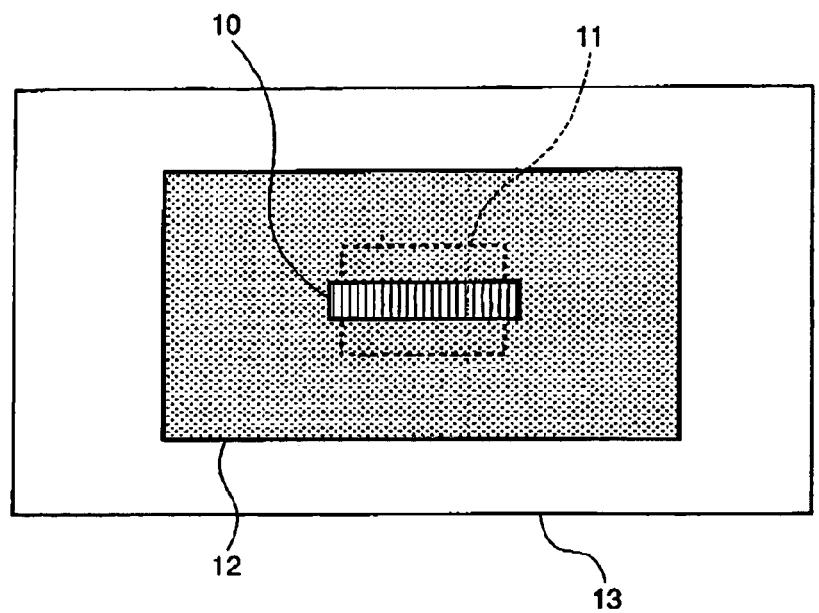
FIG. 6 is a diagram showing sizes of the distance measurement sensor and the photometry sensor when being projected on a subject in accordance with the embodiment of the present invention.
Figure 7:
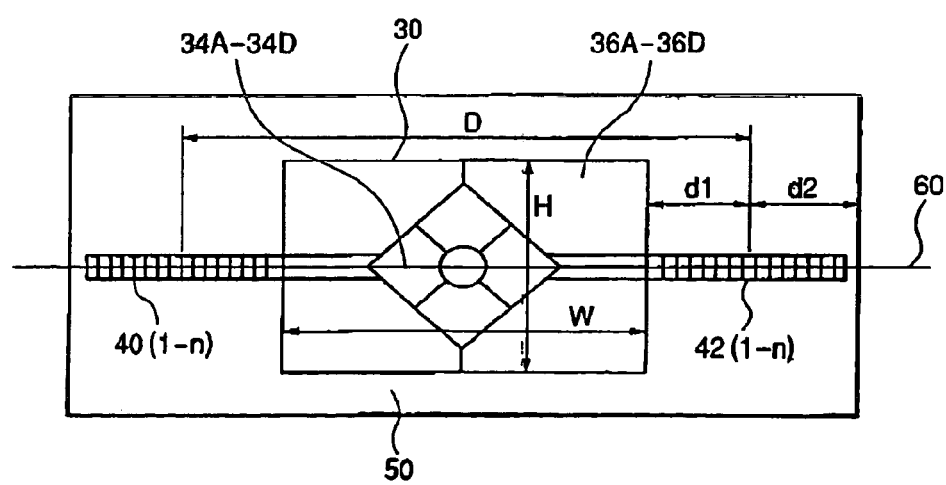
FIG. 7 is a structural diagram showing a schematic planer layout of a conventional distance measurement and photometry sensor device.

FIG. 6 is a diagram showing sizes of the distance measurement sensor and the photometry sensor when being projected on a subject.

In FIG. 6, a projection drawing 10 of the distance measurement sensor shows a state in which the light is imaged on the subject surface (in a state in which the focal length is faf). A projection drawing 11 shows the case where the focal length of the photometry condenser lens 9 is tentatively set to faf similarly to the case of the distance measurement image formation lens. In this case, as apparent from the figure, a photometry range becomes remarkably narrow for the subject surface. On the other hand, a projection drawing 12 shows a case where the focal length of the condenser lens 9 is made different from that of the distance measurement image formation lens, and hence is set to fae as shown in FIG. 5. In this case, since the light is not imaged on the subject surface, but becomes a blur image (while the illustration is made in the figure as if the light is imaged, in actuality, the light becomes a blur image), the photometry for a considerable wide range becomes possible. Also, reference numeral 13 shows a photographing range on the subject surface.

As apparent from the above description, the size of the semiconductor chip on which the distance measurement and photometry sensor device according to the embodiment of the present invention is formed in the direction perpendicular to the base length direction is determined on the basis of the longitudinal size of each of the photodiode cells, and the layout of the distance measurement signal processing circuits (including the sensor amplifiers, the noise removal circuits, the maximum value detection circuits, the noise removal circuits, the signal output circuit, and the shift registers). In this embodiment, the above-mentioned size becomes L as shown in FIG. 3. Consequently, it is most efficient in terms of reduction of the chip size in the vertical direction to arrange the photometry sensor in the direction perpendicular to the base length direction, i.e., normally, in the short side direction of the photographing screen so that the center of the photometry sensor is deviated from each of the centers of the distance measurement sensors. In addition, if the above-mentioned size is equal to the size L of each of the distance measurement sensor portions (meaning including the circuit portions), then it becomes possible to combine the distance measurement sensors and the photometry sensor with each other without increasing the chip size as compared with a distance measurement IC constituted by only distance measurement sensors. In this connection, taking only the direction perpendicular to the base length direction into consideration, the size of the photometry sensor in the vertical direction must be made equal to or smaller than the size L of each of the distance measurement sensors. In this case, if the sizes of the distance measurement analog circuit 3, the digital circuit 4, and the photometry analog circuit 6 are the sizes as shown in FIG. 1, then those circuits can be arranged together. In addition, if the photometry sensor can be miniaturized, then the circuits may also be arranged in the upper and lower positions with respect to the photometry sensor concerned, and the size of the semiconductor chip in the vertical direction may also be made equal to or smaller than the size L of each of the distance measurement sensors shown in FIG. 1.

In addition, the sensor center of the photometry sensor and the sensor centers of the distance measurement sensors preferably coincide with each other in the base length direction with respect to the photographing screen (i.e., arranged coaxially in the direction perpendicular to the base length direction). For this reason, the optical axes of the pair of imaging lenses 8a and 8b for distance measurement, and the optical axis of the condenser lens 9 for photometry are deviated (i.e., offset) in the direction perpendicular to the base length direction by the distance d, the direction and the distance of the deviation being the same as those for the sensor centers of the distance measurement sensors and the sensor center of the photometry sensor (refer to FIG. 1), so that the projection surface of each of the imaging lenses and the projection surface of the condenser lens coincide with each other on the photographing screen.

In addition, it is preferable in terms of obtaining the proper exposure that the photometry sensor is adapted to measure the luminous intensity of a wide area of the photographing screen as much as possible. For this reason, in this embodiment, as shown in FIG. 5, the focal length of each of the imaging lenses 8a and 8b, and the focal length of the condenser lens 9 are made different from each other as shown in the form of faf and fae, and the focal position of the condenser lens 9 for photometry is set backwardly with respect to the sensor surface, whereby the light from the photometry sensor is blurred on the photographing screen to make the photometry of a wide area possible as shown in FIG. 6. Note that, it is to be understood that the focal position of the condenser lens 9 is not set backwardly with respect to the sensor surface as shown in FIG. 5, but may also be set forwardly with respect to the sensor surface.

According to the above-mentioned embodiment, in the distance measurement and photometry sensor device having a high performance photometry function and a high performance distance measurement function, as shown in FIG. 1, the distance measurement sensors, and the photometry sensor arranged between the pair of line sensors constituting the distance measurement sensors are arranged so that the sensor centers of the distance measurement sensors, and the sensor center of the photometry sensor are offset in the direction perpendicular to the base length direction. As a result, even in the case of a sensor device having a distance measurement function and a photometry function combined with each other, the sensor device can be configured in the form of one chip without increasing a chip size, thereby being superior to the sensor device having only the distance measurement function.

In addition, the optical system for distance measurement, and the optical system for photometry are offset as shown in FIG. 4, whereby the sensor centers of the distance measurement sensors and the sensor center of the photometry sensor can be made to coincide with each other on the photographing screen. Also, the focal lengths of the optical systems are made different from each other as shown in FIG. 5, whereby the lights can be suitably projected on the photographing screen for the respective sensors.

The present invention is not limited to the above embodiments, and various changes and modifications can be made within the sprit and scope of the present invention. Therefore, to apprise the public of the scope of the present invention, the following claims are made.

What is claimed is:

1. A distance measurement and photometry sensor device, comprising:
   first and second sensors arranged apart from each other in a first direction for receiving lights from the outside;
   a third sensor arranged between the first and second sensors and adapted to receive the light from the outside; and
   a signal processing unit including circuit portions for processing signals from the first and second sensors, wherein:
   the third sensor is arranged so as to be deviated from each of the first and second sensors in a second direction different to the first direction, and the circuit portions constituting the signal processing unit are arranged in the second direction with respect to the first and second sensors.

2. A distance measurement and photometry sensor device, comprising:
   first and second sensors arranged apart from each other in a first direction for receiving lights from the outside to sense a defocus condition;
   a third sensor arranged between the first and second sensors for receiving the light from the outside to sense a light intensity;
   first and second optical systems for guiding the lights from the outside to the first and second sensors, respectively; and a third optical system for guiding the light from the outside to the third sensor, wherein:

the third sensor is arranged in a second direction different to the first direction so as to be deviated from each of the first and second sensors, and the first and second optical systems and the third optical system are arranged so as to deviate optical axes of the first and second optical systems and an optical axis of the third optical system from each other in second direction.

3. A distance measurement and photometry sensor device according to claim 2, wherein the circuit portions constituting the signal processing unit are arranged in the direction perpendicular to the first direction with respect to at least the first and second sensors of the first and second sensors, and the third sensor.

4. A distance measurement and photometry sensor device according to claim 2, wherein a focal length of each of the pair of first and second optical systems, and a focal length of the third optical system are made different from each other.

5. A distance measurement and photometry sensor device according to claim 4, wherein the pair of first and second optical systems are adapted to focus the lights from the outside on the first and second sensors, respectively, and the third optical system is adapted to condense the light from the outside on the third sensor.

6. A distance measurement and photometry sensor device, comprising:

first and second sensors arranged on the same semiconductor chip apart from each other by a predetermined base length for receiving lights from a subject;

a photometry sensor arranged between The first and second sensors on the semiconductor chip for receiving the light from the subject; and first, second, and third optical units for focusing or condensing the lights from the subject on the first and second sensors and the photometry sensor, respectively, wherein the pair of first and second sensors, and the photometry sensor are arranged so as to be offset in a direction perpendicular to a base length direction by a predetermined distance, and optical axes of the optical units correspond to the distance at which the first and second sensors, and the photometry sensor are offset.

7. A distance measurement and photometry sensor device according to claim 6, further comprising a signal processing unit for converting signals from the first and second sensors into voltage signals, respectively, to process the resultant voltage signals, wherein a size of the photometry sensor in a direction perpendicular to the base length direction is made smaller than a size of each of the first and second sensors and the signal processing unit in the direction perpendicular to the base length direction.

8. A distance measurement and photometry sensor device according to claim 6, wherein focal lengths of the first, second, and third optical units for focusing or condensing the lights from the subject on the first and second sensors and the photometry sensor, respectively, are made different from one another.

9. A distance measurement and photometry sensor device according to claim 8, wherein a focal length position of each of the first and second optical units corresponds to a position where the first and second sensors are arranged, and a focal length position of the third optical unit is before or after a position where the photometry sensor is arranged.

* * * * *